US005510764A

United States Patent [19]

Hauptli

[11] Patent Number: 5,510,764

[45] Date of Patent: Apr. 23, 1996

[54] DEVICE FOR DETECTING SCHOOL BUS STOP ARM VIOLATIONS

[76] Inventor: Wayne L Hauptli, 4519 110th St., Glenco, Minn. 55336

[21] Appl. No.: 358,205

[22] Filed: Dec. 16, 1994

Related U.S. Application Data

[63] Continuation of Ser. No. 227,508, Apr. 14, 1994, Pat. No. 5,382,953.

[51] Int. Cl.[6] .......... B60Q 1/26

[52] U.S. Cl. .......... 340/433; 340/937; 348/148; 346/107.2

[58] Field of Search .......... 340/433, 937; 348/118, 143, 148, 149; 346/107 VP

[56] References Cited

U.S. PATENT DOCUMENTS

| | | | |
|---|---|---|---|
| 2,347,194 | 4/1944 | Holliday | 177/337 |
| 2,603,700 | 7/1952 | Martin | 340/433 |
| 3,167,381 | 1/1965 | Wick et al. | 346/107 |
| 3,778,761 | 12/1973 | Cribbins . | |
| 3,902,159 | 8/1975 | Parolin | 340/433 |
| 4,491,967 | 1/1985 | Kobayashi et al. | 455/41 |
| 4,884,072 | 11/1989 | Horsch | 340/937 |
| 4,887,080 | 12/1989 | Gross | 340/937 |
| 4,916,372 | 4/1990 | Reavell et al. | 340/433 |
| 4,988,994 | 1/1991 | Loeven | 340/936 |
| 5,027,200 | 6/1991 | Petrossian et al. | 348/148 |
| 5,041,828 | 8/1991 | Loeven | 340/937 |
| 5,166,663 | 11/1992 | Leis | 340/433 |
| 5,204,675 | 4/1993 | Sekine | 340/933 |
| 5,281,948 | 1/1994 | Estrada | 340/433 |
| 5,293,151 | 3/1994 | Rose | 340/433 |
| 5,319,394 | 6/1994 | Dukek | 348/148 |
| 5,382,953 | 1/1995 | Hauptli | 340/937 |

*Primary Examiner*—Brent A. Swarthout
*Attorney, Agent, or Firm*—Kinney & Lange

[57] ABSTRACT

The present invention relates to a device for detecting and identifying school bus stop arm violations. The device includes a sensor positionable on a school bus for detecting the presence of a moving vehicle in a violation zone adjacent to the school bus. A detection mechanism detects the extension of the stop arm on the school bus. A control unit is operable with the sensor and the detection mechanism and provides a control signal indicating the presence of a vehicle in the violation zone when the stop arm is extended. A camera which is responsive to the control signal photographs the moving vehicle in the violation zone.

20 Claims, 1 Drawing Sheet

DEVICE FOR DETECTING SCHOOL BUS STOP ARM VIOLATIONS

This is a continuation of application Ser. No. 08/227,508, filed Apr. 14, 1994, now U.S. Pat. No. 5,382,953.

BACKGROUND OF THE INVENTION

The present invention relates to a device for detecting school bus stop arm violations and for identifying the vehicles which perform these violations, and more particularly to device which is mounted within the school bus.

School buses are equipped with stop arms which are activated by the opening of the school bus door. More particularly school buses are equipped with an 8-way flasher control unit which controls activation of the amber flashers at the front and rear of school buses. A master switch controls power to the 8-way flasher control unit. When the master switch is engaged power from the 8-way flasher control unit is routed through a switch which operates with the school bus door handle. When the door handle is moved to open the door the switch is closed and power is supplied to a motor for extending the stop arm. The school bus stop arm alerts motorists that people, usually children, are either entering or exiting the school bus so that the motorists stop their vehicles a sufficient distance from the front and rear of the school bus to permit these children to cross the street if necessary. Motorists that disobey the stop arm and continue traveling past the school bus endanger the lives of the children and also violate motor vehicle laws.

SUMMARY OF THE INVENTION

The present invention relates to a device for detecting and identifying school bus stop arm violations. The device includes a sensor, a detection mechanism, a control unit and a camera. The sensor is positionable on a school bus for detecting the presence of a moving vehicle in a violation zone adjacent to the school bus. The detection mechanism detects the extension of the-stop arm on the school bus. The control unit is operable with the sensor and the detection mechanism and provides a control signal indicating the presence of a vehicle in the violation zone when the stop arm is extended. The camera is responsive to the control signal and photographs the moving vehicle in the violation zone.

In an illustrated embodiment the sensor is a magnetic flux sensor probe which is positioned at a front end of the school bus and the camera is positioned at the rear of the school bus, at least 20 feet from the sensor, for photographing vehicles in the violation zone and the extended stop arm. A manually operated trigger switch positioned between the control unit and the camera ensures that inadvertent motion in the violation zone does not trigger the camera.

BRIEF DESCRIPTION OF THE DRAWINGS

The sole Figure is a diagrammatic view of a school bus and the device for detecting school bus stop arm violations according to the present invention.

DETAILED DESCRIPTION OF THE PREFERRED EMBODIMENTS

Figure 1:
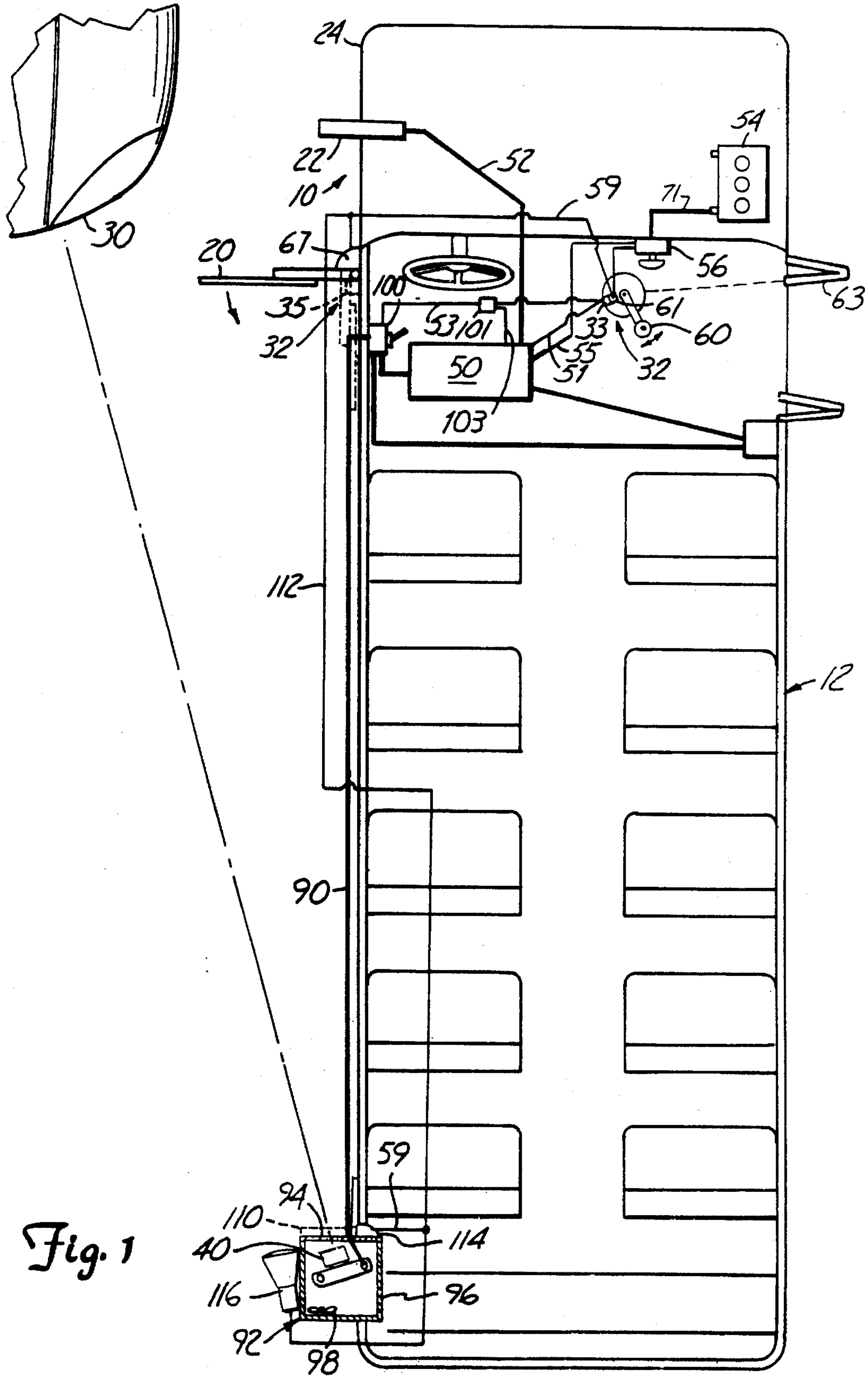

Referring to the Figure, a device 10 for detecting and identifying school bus stop arm violations is mounted within a school bus 12. The device 10 may be manufactured and sold separately as an add on unit for school busses and permits the detection and identification of vehicles moving past an extended the stop arm 20 of the school bus 12 when children may be entering or exiting the school bus 12. The device 10 includes a sensor 22, a detection mechanism 32, a control unit 50 and a camera 40. The sensor 22 is positionable in a front end 24 of the school bus 12 for detecting the presence of a moving vehicle 30 in a violation zone adjacent the school bus 12. The detection mechanism 32 detects the extension of the stop arm 20. The camera 40 photographs the moving vehicle 30 in the violation zone when the stop arm 20 is extended. The control box or unit 50 receives signals from the sensor 22 indicating the presence of a vehicle 30 in the violation zone. The control unit 50 is operable with the detection mechanism 32 and provides a control signal to activate the camera 40 when the stop arm 20 is extended.

The sensor 22 is a magnetic flux sensor probe which detects a moving vehicle 30 by disturbances in the earth's magnetic field. The probe is mounted to the front end 24 of the school bus 12 and the sensitivity is adjusted to detect vehicles in the violation zone. The activation signal is sent from the sensor probe to the control box 50 along line 52. The probe is well known to those skilled in the part and may be, for example, a CT-6 Cartell Driveway Sensor Probe available from Preferred Technologies Group, of Landcaster, Pa.

The control box 50 is a CT-2B control unit available from Cartell Preferred Technologies Group for use with the CT-6 Cartell Driveway Sensor Probe. The control box 50 may be positioned anywhere in the interior of the school bus 12 and preferably under one of the seats. The control box 50 should be installed away from equipment which would introduce electrical or R.F. noise. The control box 50 is powered from a school bus battery 54 through an 8-way flasher unit control master switch 56 of the school bus 12. Power from the battery 54 is supplied to the 8-way flasher unit master switch 56 through line 71, and from the master switch 56 to the control box 50 through line 55. However, any 12 V DC power source on the school bus 12 can be used to power the control box 50. It is within the intended scope of the present invention to provide a self contained battery for powering the control box 50 independent of the school bus battery 54. In such an arrangement the battery would be connected directly to the control box 50. The CT-2B control unit includes an optional attachment for any 12 volt DC power pack battery backup. The control box 50 outputs a control signal along line. 53 for activating the camera 40.

A switch 61 at the school bus door handle 60 triggers the extension of the stop arm 20. The switch 61 is operatively connected to the door handle 60 and controls the operation of a stop arm extension motor 67. When the door handle 60 is closed the school bus door 63 is closed and the switch 61 is opened so that no power is supplied to the stop arm extension motor 67 along line 59. When the door handle 60 is opened, the school bus door 63 is opened and the switch 61 is closed so that power is supplied to the stop arm extension motor 67 for extending the stop arm 20.

The detection mechanism 32 detects the extension of the stop arm 20. In the preferred embodiment the detection mechanism 32 is a push button switch 33 which opens and closes line 53. The push button switch 33 is operatively connected to the door handle 60 since opening of the door handle 60 triggers extension of the stop arm 20 through the closing of switch 61 when the master switch 56 of the 8-way flasher unit is activated. The push button switch 33 controls transmission of the control signal from the control box 50 along line 53. The push button switch 33 is normally opened when the door handle 60 is closed to prevent transmission of the control signal along line 53 because the stop arm is not extended. The push button switch 33 may be the same as the switch 61 for triggering the extension of the stop arm 20 and is preferably positioned adjacent the switch 61. When the school bus door handle 60 is open, the push button switches 61 and 33 are closed, the stop arm extension signal is transmitted along line 59 to the stop arm extension motor 67 to extend the stop arm 20, and the control signal is transmitted along line 53 from the control box 50 to the camera 40.

In another embodiment the push button switch 33 of the detection mechanism 32 may include a sensor or switch 35 (shown in phantom) on the stop arm 20 itself which directly detects the extension of the stop arm 20 and arms the circuit. In either case, if a vehicle 30 is detected by the sensor 22 a control signal from the control box 50 will be transmitted along lines 51, 53 and 90 to activate the camera 40 automatically without operator intervention when the stop arm detection mechanism 32 has armed the circuit. Although standard switches have been described for the detection mechanism 32, any type of electrical, mechanical or optical detection mechanism which indicates the opening of the door handle 60 or extension of the stop arm 20 is intended to be within the scope of the present invention.

A manually operated trigger switch 100 may be positioned between the door handle switch 33 of the detection mechanism 32 and the camera 40. The manually operated trigger switch 100 is normally open and acts as a time delay to permit extension of the stop arm 20 to ensure that inadvertent motion in the violation zone, such as the motion of the stop arm 20 from its retracted position adjacent to the school bus 12 (shown in phantom) to its extended position perpendicular to the school bus 12, does not trigger the camera 40. Since the trigger switch 100 is manually activated by the bus driver there is a delay in the control signal being sent to the camera 40. In this way, the trigger switch 100 prevents inadvertent triggering of the sensor 22 and the camera 40 due to motion of the stop arm 20 from its retracted position to its extended position. Thus, only when the stop arm 20 is extended and only after the operator activates the trigger switch 100, would the camera 40 photograph the vehicle 30 in the violation zone. The trigger switch 100 may also have an override function permitting the driver to activate the camera 40 when he/she sees a violation taking place. The trigger switch 100 is positioned adjacent to the bus driver in the vicinity of the driver seat for easy access.

An indicating means 101 may be provided on line 53 for alerting the driver of the presence of a vehicle 30 in the violation zone. The indicating means 101 may be a simple light or horn, powered from the control box 50 along line 103. The light or horn would alert the driver of a possible violation so that the driver could then manually activate the trigger switch 100, if necessary, to activate the camera 40 if a vehicle is present in the violation zone.

The camera 40 may be of any type having a remote adapter which activates the camera shutter upon receipt of a control signal along line 90. The camera 40 may be for example a Cannon EOS RT with a GR20 Grip which has a threaded opening for receiving the line 90 from the control box 50. The camera 40 is positioned in a protected box 92 (shown in cross-section) which seals the camera 40 from the natural elements and prevents theft and vandalism of the camera 40, The protective box 92 includes at least five sides made from metal or the like and a glass or dear plastic face 94 permitting the camera 40 to photograph the vehicle 30 and stop arm 20. The camera 40 is positioned towards the rear of the school bus 12 preferably at least 20 to 30 feet apart from the sensor 22 and angled at a such a position to photograph both the extended stop arm 20 and the moving vehicle 30 in the violation zone. The protective box 92 is accessible from a door 96 mounted in the interior of the school bus. A fan 98 or other type air in the box and to keep the glass or plastic face 94 dean, clear and free of condensation. The fan 98 is powered through the ignition switch of the school bus 12 or through another constant power source to keep the face 94 clear.

A flood light 116 may also be positioned in or adjacent the protective box 92 for low light conditions because a camera flash may blind oncoming vehicles 30. The flood light 116 may be activated with the extension of stop arm 20 through line 112.

A splash guard 110 is positioned across the face 94 of the protective box 92 to prevent mud, rain and other elements from collecting on the face 94 when the school bus 12 is en route. The splash guard 110 is operatively connected to the 8-way flasher control unit 56 in parallel with the stop arm 20 through lines 112 and 59 such that activation of the stop arm 20 causes the splash guard 110 to be pivoted open to expose the face 94 of the protective box 92 to permit the camera 40 to photograph a vehicle 30 in the violation zone. A solenoid 114 or other extension/retraction device is provided to pivot the splash guard 110 from its closed position adjacent the face 94 to an open position spaced apart from the face 94. The splash guard 110 is only open when the stop arm 20 is extended. Thus, the stop arm 20 is extended only when the school bus 12 is stopped and the door is open. The splash guard 110 is closed when the school bus 12 is moving when the face 94 is most likely to become soiled.

In operation, the school bus 12 approaches a stop to allow children to exit or enter the school bus 12. The master switch 56 of the 8-way flasher control unit has already been activated to provide power to the control box 50. When the school bus 12 is stopped the school bus door handle 60 is opened. Upon opening the school bus door handle 60 the 8-way flasher control unit 56 is activated which thereby closes the switch 61 which triggers an extension of the stop arm 20 and the opening of the splash guard 110 to expose the face 94 of the protective box 92. When a vehicle 30 enters the violation zone the sensor 22 detects a change in the magnetic field and provides an activation signal to the control box 50 along line 52. The control box 50 then outputs a control signal along line 53 through the door handle switch 33 or stop arm switch 35 of the detection mechanism 32. The switches 33 or 35 are closed by the opening of the door handle 60. The bus driver may activate the trigger switch 100 after the stop arm 20 has been extended to permit the control signal to activate the camera 40 when a vehicle in the violation zone trips the sensor 22. The camera 40 photographs the vehicle 30 in the violation zone with the stop arm 20 extended upon receipt of the control signal on 53. When the door handle 60 is closed the activation signal at switch 33 is removed and the camera 40 cannot be activated. By closing the door handle 60 the stop arm 20 is retracted and the splash guard 110 is closed.

Although the present invention has been described with reference to preferred embodiments, Workers skilled in the art will recognize that changes may be made in form and detail without departing from the spirit and scope of the invention.

What is claimed is:

1. A device for identifying school bus stop arm violations wherein a moving vehicle enters a violation zone adjacent the school bus when a school bus stop arm is extended, the device comprising:

a control unit positionable on the school bus for providing a control signal when the stop arm is extended; and a camera positionable on the school bus and responsive to the control signal for photographing the moving vehicle in the violation zone and the extended school bus stop arm.

2. The device of claim 1, further comprising a manually operated trigger switch positioned between the control unit and the camera to provide a time delay in the control signal activation of the camera.

3. The device of claim 1, further comprising stop arm detecting means for detecting the extension of the stop arm on the school bus, the control unit being operable with the stop arm detecting means such that the camera is enabled only when the stop arm detecting means detects the extension of the stop arm.

4. The device of claim 3, wherein the stop arm detecting means includes means for detecting when a door handle of the school bus is moved to open the door on the school bus and wherein the stop arm is extended when the door handle is moved.

5. The device of claim 4, wherein the means for detecting the opening of the school bus door includes a switch operable with the school bus door handle such that when the door handle is closed the switch is open and then the door handle is open the switch is closed.

6. The device of claim 3, wherein the stop arm detecting means is positioned on the stop arm.

7. The device of claim 6, wherein the stop arm detecting means is a push button switch operable with the stop arm such that when the stop arm is extended the switch is closed and when the stop arm is retracted the switch is open.

8. The device of claim 1, wherein the control unit is powered in association with and thereby operable with a flasher control unit on the school bus.

9. The device of claim 1, further comprising a protective box for housing the camera, the protective box being positioned on an exterior side of the school bus such that the camera photographs vehicles in the violations zone and the extended stop arm.

10. The device of claim 9, wherein the protective box further includes defogging means for preventing the accumulation of moisture within the protective box which interferes with the camera.

11. The device of claim 9, wherein the protective box is accessible from an interior of the school bus.

12. The device of claim 9, further comprising a splash guard for protecting a face of the protective box, the splash guard being movable away from the face to permit the camera to photograph vehicles in the violation zone and the extended stop arm.

13. The device of claim 12, further comprising sensor means for providing an audible signal indicative of a vehicle in the violation zone so that a bus driver is alerted to activate the manually operated trigger switch.

14. The device of claim 1, further comprising a flood light providing light to the violation zone.

15. A method for identifying school bus stop arm violations wherein a moving vehicle enters a violation zone adjacent the school bus when a school bus stop arm is extended, comprising:

providing a control signal when the stop arm is extended; and photographing the moving vehicle in the violation zone together with the extended school bus stop arm in response to the control signal.

16. The method of claim 15 further comprising detecting the extension of the stop arm on the school bus thereby enabling the control signal.

17. The method of claim 15, wherein the providing step further includes triggering a manually operated switch enabling the transmission of the control signal to a camera for photographing the vehicle.

18. The method of claim 15, further comprising providing a protective box for housing a camera, the protective box being positioned on an exterior side of the school bus such that the camera photographs vehicles in the violation zone and the extended stop arm.

19. The method of claim 18, further comprising providing defogging means for preventing the accumulation of moisture within the protective box which interferes with the photographing of the moving vehicle.

20. The method of claim 18, further comprising providing a splash guard for protecting a face of the protective box, and selectively moving the splash guard away from the face to permit the camera to photograph vehicles in the violation zone and the extended stop arm.

* * * * *

UNITED STATES PATENT AND TRADEMARK OFFICE

CERTIFICATE OF CORRECTION

PATENT NO. : 5,510,764

DATED : April 23, 1996

INVENTOR(S) : WAYNE L. HAUPTLI

It is certified that error appears in the above-indentified patent and that said Letters Patent is hereby corrected as shown below:

Col. 2, line 22, delete "part", insert --art--

Col. 3, line 64, delete "dear", insert --clear--

Col. 4, line 5, after "type", insert --of anti-fog device may be placed within the protective box 92 to circulate the--

Col. 4, line 6, delete "dean", insert --clean--

Col. 4, line 59, delete "Workers", inserts --workers--

Signed and Sealed this

Twenty-third Day of July, 1996

*Attest:*

Bruce Lehman

BRUCE LEHMAN

*Attesting Officer*

*Commissioner of Patents and Trademarks*